Patented June 3, 1952

2,599,089

UNITED STATES PATENT OFFICE 2,599,089

CATALYTIC HYDROGENOLYSIS OF CYCLO-ALIPHATIC ALCOHOLS, KETONES, AND ALDEHYDES

John E. Castle, New Castle, and Benjamin W. Howk, Wilmington, Del. assignors to E. I. du Pont de Nemours & Company, Wilmington, Del., a corporation of Delaware No Drawing. Application September 20, 1948, Serial No. 50,238

6 Claims. (Cl. 260—666)

This invention relates to hydrogenolysis processes and more particularly to the catalytic hydrogenolysis of certain classes of oxygenated compounds.

It is known that hydrogenolysis occurs readily when oxygen-containing compounds having a carbinol or oxo group labilized by an activating group within the molecule are heated with hydrogen at elevated temperatures under pressure in the presence of a hydrogenation catalyst such as nickel. For example, Adkins on page 69 in his book on "Reactions of Hydrogen," The University of Wisconsin Press, Madison, Wisconsin (1937), points out that benzyl alcohol is converted almost quantitatively to toluene by heating over nickel at 100° to 125° C. and that ethyl benzoate yields toluene at 250° C. over a copper-chromium oxide catalyst (page 101). Acetophenone over nickel at 175° C. yields ethylbenzene (page 71). Attempts to effect a similar hydrogenolysis on compounds containing either carbinol or oxo groups in non-labilized condition have either been unsuccessful or else have given indifferent yields of the desired hydrocarbon.

It is an object of this invention to provide a method for the hydrogenolysis of selected classes of oxygenated compounds free from aromatic unsaturation. A further object is to provide a method for the catalytic hydrogenolysis of cycloaliphatic alcohols, aldehydes and ketones to compounds having the same carbon skeleton as the starting material. A still further object is to provide a method for the catalytic hydrogenolysis of cycloaliphatic alcohols, aldehydes and ketones containing the hydroxyl or oxo grouping in a non-labilized condition and obtaining therefrom high yields of hydrocarbons having the same carbon skeleton as the starting material. Other objects will appear hereinafter.

These objects are accomplished by the following invention of a catalytic hydrogenolysis process which comprises passing over a platinum catalyst at a temperature above 140° C., hydrogen and in the vapor phase a member selected from the group of oxygenated compounds free from aromatic unsaturation consisting of cycloaliphatic alcohols, aldehydes and ketones and obtaining a compound therefrom having the same carbon skeleton as the oxygenated compound passed over said platinum catalyst. It has now been discovered that the hydrogenolysis of cycloaliphatic alcohols, aldehydes and ketones containing the hydroxyl or oxo groupings in non-labilized condition can be smoothly carried out to give good yields of the desired hydrocarbons by effecting the reaction in the vapor phase over a platinum catalyst at a temperature in excess of 140° C. More particularly it has been found that by reacting a cycloaliphatic alcohol, aldehyde, or ketone in the vapor phase with hydrogen at a temperature in excess of 140° C. over a platinum catalyst at essentially atmospheric pressure there are obtained in high yields hydrocarbons having the same carbon skeleton as the parent materials.

In practice it has been found that the reaction is conveniently effected by passing a gaseous mixture of the cycloaliphatic alcohol, aldehyde, or ketone and hydrogen continuously at essentially atmospheric pressure over a platinum catalyst heated to between 140° C. and 350° C. As a rule, a mixture of the cycloaliphatic aldehyde, ketone or alcohol and hydrogen is passed into a chamber heated to a temperature near that selected for effecting the reaction, and the heated gas mixture so obtained is then passed into a chamber containing the catalyst maintained at the selected reaction temperature, where the exothermic hydrogenation occurs. The gas stream is cooled, the organic product is separated and the unreacted hydrogen, if desired, re-cycled into the system.

The examples which follow illustrate more particularly the practice of this invention.

*Example I*

A catalyst is prepared by dissolving a quantity of chloroplatinic acid equivalent to 1.5 g. of platinum in 150 ml. distilled water. Coconut charcoal of convenient lump size, e. g., 4–14 mesh, is purified by heating in a stream of hydrogen at 450° C. for approximately twenty hours, followed by heating at 100° C. in 10% nitric acid for six hours. The charcoal then is washed with distilled water, dried at 100° C., and the last traces of nitric acid are removed by heating the charcoal for one hour at 450° C. in a stream of nitrogen. The chloroplatinic acid solution is poured over 150 ml. of the purified charcoal and the mixture is evaporated to dryness on a steam bath. An apparatus for vapor phase hydrogenolysis consists of a Pyrex U-tube, 22 mm. O. D., immersed to a depth of 10 inches in a bath of liquid boiling at the temperature chosen for conducting the reaction. Hydrogen and the ketone, aldehyde, or alcohol are fed downward into one leg of the U-tube, which contains Pyrex helices or granular charcoal packing. The mixture of vapors then passes upward through the other leg of the U-tube which contains 50 ml. of the platinum catalyst. The products are taken off above the catalyst thru a water-cooled condenser and collected in a receiver cooled with Dry Ice.

Operating with cyclohexanone at a bath temperature of 260° C., a feed rate of 10.7 g. per hour, and 160 l./hr. of excess hydrogen, there is collected over a period of six hours a mixture of hydrocarbon and water. By distillation, the hydrocarbon layer is found to consist of 80.5% cyclohexane, 12.2% benzene, and 7.3% higher boiling material.

*Example II*

Cyclohexanone is treated with hydrogen at 155° C. using the catalyst and apparatus described in Example I. At a feed rate of 5–10 g. cyclohexanone per hour and 160 l./hour excess hydrogen, there is obtained over a period of six hours a product consisting of a water layer and a layer of organic liquids. Distillation of the organic material yields 10.2 g. cyclohexane, a 30% conversion, 11.7 g. cyclohexanol, and 3.0 g. high boiling material.

Operation at temperatures below 140° C. fails to yield cyclohexane; the chief product isolated at the lower temperatures is cyclohexanol.

*Example III*

Cyclohexanol is passed over the catalyst described in Example I at 155° C. at a feed rate of 7–10 g. per hour with 160 l./hour excess hydrogen. The product obtained over a period of six and one-half hours consists of water and a layer of organic liquids. Distillation of the organic material yields 29 g. cyclohexane, corresponding to 72% conversion, and 2.2 g. unreacted cyclohexanol.

Substantially identical results are obtained with cyclohexanol at higher temperatures, but no reaction occurs at temperatures below 140° C.

*Example IV*

Tetrahydro-2-furanpentanol is passed over the catalyst described in Example I at a temperature of 260° C. using a feed rate of 7.5 g. per hour and 160 l./hour excess hydrogen. The product obtained from five hours operation is distilled, yielding 7.6 g. 2-amyltetrahydrofuran, corresponding to a 24% conversion, 4.4 g. hydrocarbon, and 3.2 g. high boiling material. The 2-amyltetrahydrofuran is a clear, colorless liquid: B. P. 150° C. at atmospheric pressure;

$$n_D^{25} = 1.4161; \quad d^{25} = 0.8193.$$

Anal. Calc'd for $C_9H_{18}O$ : C, 76.00; H, 12.75. Found: C, 75.77, H, 12.86.

Although the examples have illustrated specific conditions of catalyst concentration, space velocity, temperature, duration of reaction, etc., it is to be understood that these may be varied somewhat since the conditions of each experiment are determined by the particular compound being reacted, the temperature employed, etc.

In general the hydrogenolysis is effected at pressures which are essentially atmospheric and temperatures which range from 140° C. to 350° C. Since satisfactory reaction rates are obtained at temperatures of from 150° C. to 300° C., this range is regarded as the most useful. If desired, pressures which are slightly below or above atmospheric may be used.

The amount of hydrogen employed depends upon the particular compound being treated. Thus, in the case of the alcohols one mole of hydrogen per carbinol group is required whereas in the case of the aldehydes and ketones two moles of hydrogen per oxo group are required. In actual practice, however, larger amounts are employed to aid in the vaporization of the alcohol, ketone, or aldehyde, to insure complete reaction, and also to aid in the removal of the exothermic heat of reaction.

In practice, it is necessary to employ very efficient condensing means to recover the hydrogenolysis product carried over by the excess hydrogen, and also to recirculate the hydrogen through the reactor, in order to insure complete recovery of these values. In the laboratory it is difficult to attain these conditions and therefore it is to be understood that the yields given in the examples are lower than the actual yields under the conditions used due to loss of product in the effluent hydrogen.

Any suitable platinum catalyst may be used in the practice of this invention. Thus, there may be used metallic platinum or any of its compounds such as the oxide, chloride, hydrochloride, and the like, either unsupported or supported on such materials as charcoal, alumina, pumice, silica, and the like. During operation platinum compounds are reduced to metallic platinum. A suitable platinum catalyst is one prepared by depositing platinum chloride on charcoal in amount sufficient to provide 10 grams of platinum per liter of catalyst. This is equivalent to 2% platinum on the charcoal.

A suitable amount of catalyst is such as to furnish at least 0.001 gram of platinum per gram of compound being processed per hour. Ordinarily larger amounts of the order of 0.02 gram of platinum per gram of compound being processed per hour is employed because the advantages accruing from the standpoint of speed of reaction offset the added catalyst cost.

If desired, the process may be carried out in the presence of an inert solvent such as an aliphatic hydrocarbon, and the like. The use of such solvents adds to the cost without compensating practical advantages and the process is therefore generally operated in the absence of solvents or diluents.

The compounds processed according to this invention are cycloaliphatic aldehydes, alcohols and ketones which consist solely of carbon, hydrogen and oxygen atoms. Particularly preferred compounds are those compounds containing up to twenty carbon atoms. Examples are cyclohexane-1-carboxaldehyde, cyclohexanone, cyclobutyl ketone, 2-methyl-1-cyclohexyl-1-propanone, cyclohexanol, tetrahydro-2-furanpentanol, tetrahydro-2-furanethanol and the like.

The saturated cycloalkanols, cycloalkanals and cycloalkanones and the tetrahydrofuranalkanols are preferred classes of compounds for hydrogenolysis in the process of this invention to obtain compounds having the same carbon skeleton as the parent materials.

The process of this invention represents a marked technical improvement since it provides a simple means for the hydrogenolysis of cycloaliphatic aldehydes, ketones, and alcohols to hydrocarbons of the same carbon chain length as the parent materials. The process is simple since it is operated at essentially atmospheric pressure and produces the desired products in high yields with minimum of side reactions.

As many apparently widely different embodiments of this invention may be made without departing from the spirit and scope thereof, it

We claim:

1. A catalytic hydrogenolysis process which comprises heating a member selected from the group of oxygenated compounds consisting of cycloalkanols, cycloalkanals and cycloalkanones to a temperature sufficient to vaporize the same, passing under essentially atmospheric pressure a gaseous mixture consisting of said vaporized oxygenated compound and added hydrogen continuously over and in vapor phase contact with a platinum catalyst at a temperature between 140° and 350° C., cooling the gaseous products, and separating therefrom a cycloalkane having the same carbon skeleton as said oxygenated compound.

2. A catalytic hydrogenolysis process as set forth in claim 1 in which said oxygenated compound is a cycloalkanol.

3. A catalytic hydrogenolysis process as set forth in claim 1 in which said oxygenated compound is a cycloalkanone.

4. A catalytic hydrogenolysis process as set forth in claim 1 in which said oxygenated compound is a cycloalkanal.

5. A catalytic hydrogenolysis process which comprises heating cyclohexanone to a temperature sufficient to vaporize the same, passing under essentially atmospheric pressure a gaseous mixture consisting of said vaporized cyclohexanone and hydrogen continuously over and in vapor phase contact with a platinum catalyst at a temperature from 150° to 300° C., cooling the gaseous products, and separating therefrom cyclohexane.

6. A catalytic hydrogenolysis process which comprises heating cyclohexanol to a temperature sufficient to vaporize the same, passing under essentially atmospheric pressure a gaseous mixture consisting of said vaporized cyclohexanol and hydrogen continuously over and in vapor phase contact with a platinum catalyst at a temperature from 150° to 300° C., cooling the gaseous products, and separating therefrom cyclohexane.

JOHN E. CASTLE.
BENJAMIN W. HOWK.

REFERENCES CITED

The following references are of record in the file of this patent:

UNITED STATES PATENTS

| Number | Name | Date |
|---|---|---|
| 2,440,678 | Ford et al. | May 4, 1948 |

OTHER REFERENCES

Skita et al.: Berichte, vol. 44, 668–673 (1911).

Escourrou: Bull. Soc. Chim., ser. 4, vol. 43, 1101–1115 (1928).

Zelinsky et al.: Ber. der Deut. Chem. Ges., 1049–1053 (1928), vol. 61.

Zelinsky et al.: Ber. der Deut. Chem. Ges., vol. 64, 435–439 (1931).

Wojcik et al.: Jour. Am. Chem. Soc., vol. 55, 1293–4 (1933).

Foresti: Chem. Abs., vol. 32, 2089 (1938).

Farkas: Jour. Am. Chem. Soc., vol. 61, 1336–1341 (1939).

Koizumi: Chem. Abs., vol. 34, 7710–1 (1940).